United States Patent [19]

Hermann

[11] 4,330,476
[45] May 18, 1982

[54] PREPARATION OF CATIONIC TRIARYLMETHANE DYESTUFFS

[75] Inventor: Karl H. Hermann, Leverkusen, Fed. Rep. of Germany

[73] Assignee: Bayer Aktiengesellschaft, Leverkusen, Fed. Rep. of Germany

[21] Appl. No.: 163,363

[22] Filed: Jun. 26, 1980

[30] Foreign Application Priority Data

Jul. 13, 1979 [DE]  Fed. Rep. of Germany ....... 2928466

[51] Int. Cl.³ .................... C09B 11/10; C07D 209/04; C07D 265/30; C07D 209/18
[52] U.S. Cl. .................... 260/393; 546/152; 546/196; 544/105; 544/165; 544/392; 548/440; 548/455; 548/402; 548/524
[58] Field of Search ............... 260/391, 392, 388, 390, 260/393, 386, 394, 326.14, 326.15, 319.1, 326.12 R, 326.13 B; 546/152, 196; 544/105, 165, 392

[56] References Cited

U.S. PATENT DOCUMENTS

| | | | |
|---|---|---|---|
| 2,121,928 | 6/1938 | Basel | 260/393 |
| 3,828,071 | 8/1974 | Kast et al. | 546/152 |
| 4,211,436 | 7/1980 | Kuhlthau et al. | 260/391 |
| 4,211,716 | 7/1980 | Hermann et al. | 260/391 |

Primary Examiner—Thomas A. Waltz
Assistant Examiner—Raymond Covington
Attorney, Agent, or Firm—Sprung, Horn, Kramer & Woods

[57] ABSTRACT

To synthesize triarylmethane dyestuffs of the general formula

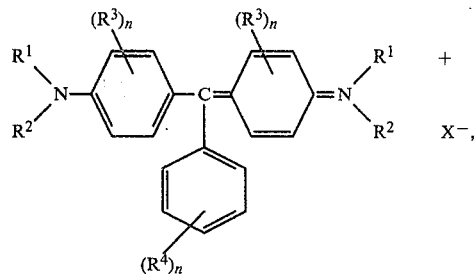

in which
$R^1$ and $R^2$ represent optionally substituted alkyl, aryl or aralkyl or
$R^1$ and $R^2$, together or with the ortho-position of the phenyl ring, form a heterocyclic ring and $R^1$ can additionally represent hydrogen,
$R^3$ and $R^4$ denote hydrogen or non-ionic substituents,
n represents an integer from 1 to 4 and
$X^-$ denotes an anion, by a one-pot process, an aldehyde of the general formula

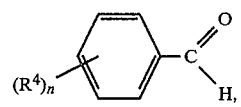

in which
$R^4$ and n have the abovementioned meaning, is subjected to a condensation reaction with an aromatic amine of the general formula

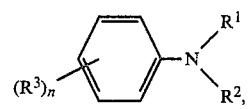

in which
$R^1$, $R^2$, $R^3$ and n have the abovementioned meaning, if appropriate in the presence of urea, and the reaction mixture thus obtained is oxidized with oxygen in the presence of catalytic amounts of benzoquinones substituted by halogen or cyano or of phenanthrenequinones substituted by nitro, and in the presence of catalytic amounts of nitrogen oxides—with the exception of dinitrogen monoxide—or of substances which produce such nitrogen oxides under the reaction conditions.

3 Claims, No Drawings

PREPARATION OF CATIONIC TRIARYLMETHANE DYESTUFFS

The invention relates to a one-pot process for the synthesis of triarylmethane dyestuffs of the general formula

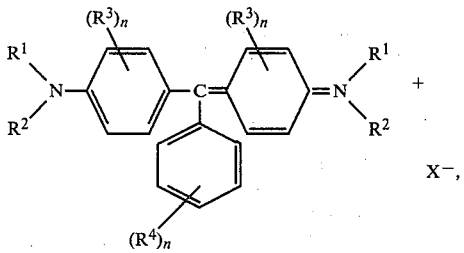

in which
R$^1$ and R$^2$ represent optionally substituted alkyl, aryl or aralkyl or
R$^1$ and R$^2$, together or with the ortho-position of the phenyl ring, form a heterocyclic ring and R$^1$ can additionally represent hydrogen,
R$^3$ and R$^4$ denote hydrogen or non-ionic substituents,
n represents an integer from 1 to 4 and
X$^-$ denotes an anion,
characterised in that an aldehyde of the general formula

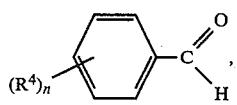

in which
R$^4$ and n have the abovementioned meaning,
is subjected to a condensation reaction with an aromatic amine of the general formula

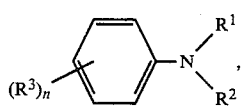

in which
R$^1$, R$^2$, R$^3$ and n have the abovementioned meaning, if appropriate in the presence of urea, and the reaction mixture thus obtained is oxidised with oxygen in the presence of catalytic amounts of benzoquinones substituted by halogen or cyano or of phenanthrenequinones substituted by nitro, and in the presence of catalytic amounts of nitrogen oxides—with the exception of dinitrogen monoxide—or of substances which produce such nitrogen oxides under the reaction conditions.

Alkyl radicals in the formulae are to be understood as, in particular, C$_1$- to C$_4$-alkyl radicals. The alkyl radicals carry, for example, 1 to 3 non-ionic substituents. Such substituents which may be mentioned are halogen, hydroxyl, C$_1$- to C$_4$-alkyl, cyano, C$_1$- to C$_4$-alkoxy, C$_1$- to C$_4$-alkoxycarbonyl, C$_1$- to C$_3$-alkylcarbonyloxy or aminocarbonyl.

Suitable aryl radicals are, in particular, optionally substituted phenyl and naphthyl radicals.

Suitable aralkyl radicals are, in particular, optionally substituted benzyl, α- or β-phenylethyl and α-, β- or γ-phenylpropyl radicals.

These homocyclic radicals can carry, for example, 1 to 3 substituents, such as halogen, C$_1$- to C$_4$-alkyl or C$_1$- to C$_4$-alkoxy.

The radicals R$^1$ and R$^2$, together or with the ortho-position of the phenyl ring, form, for example, 5-membered or 6-membered rings; together they form, for example, a piperidine, pyrrolidine, morpholine or piperazine ring, and with the ortho-position of the phenyl ring they form, for example, a tetrahydroquinoline, indoline, julolidine, phenmorpholine, tetrahydroquinoxaline or carbazole ring.

Amongst the dyestuffs described above, those of the general formula I in which
R$^1$ and R$^2$ denote C$_1$- to C$_4$-alkyl, hydroxyalkyl with two or three C atoms, cyanoethyl, alkoxyalkyl with a total of three to five C atoms, alkoxycarbonylalkyl with a total of three to eight C atoms, alkylcarbonyloxyalkyl with a total of three to eight C atoms, C$_1$- to C$_4$-halogenoalkyl, cyclohexyl, benzyl or phenethyl and R$^1$ can also represent hydrogen, phenyl or phenyl which is substituted by halogen or C$_1$- to C$_4$-alkyl or -alkoxy,
R$^3$ represents hydrogen, C$_1$- to C$_4$-alkyl, C$_1$- to C$_4$-alkoxy, chlorine or bromine,
R$^4$ denotes hydrogen, chlorine, bromine, hydroxyl, C$_1$- to C$_4$-alkyl, C$_1$- to C$_4$-alkoxy, nitro, cyano, mono-C$_1$- to -C$_4$-alkylamino or di-C$_1$- to -C$_4$-alkylamino and
n has the abovementioned meaning,
can be prepared particularly easily.

Particularly preferred dyestuffs are those of the general formula I in which
R$^1$ and R$^2$ represent methyl, ethyl, propyl, hydroxyethyl or butyl,
R$^3$ represents hydrogen, methyl or ethyl,
R$^4$ represents hydrogen, chlorine or methyl,
n represents 1 and
X$^-$ has the abovementioned meaning.

The anions are derived from inorganic or organic acids and are in general determined by the preparation process and any purification of the crude dyestuff which may be carried out. In general, the dyestuffs are in the form of zinc chloride double salts, acetates, methosulphates, ethosulphates or halides (in particular as chlorides or bromides). The anions can be replaced by other anions in a known manner.

The quinones used as oxidising agents can be: tetrachloro-, tetrabromo-, tetrafluoro-, tetracyano- or dicyanodichloro-1,4-benzoquinone, tetrachloro- or tetrabromo-1,2-benzoquinone and 2-nitro-, 2,7-dinitro- or 4,5-dinitro-phenanthrenequinone. Tetrachloro- or tetrabromo-1,4-benzoquinone is preferred. The quinones are used in amounts of 10$^{-3}$ to 10$^{-1}$ mols, relative to the molar amount of the compound III. Instead of the quinones, it is also possible to use the corresponding hydroquinones.

Suitable aldehydes are: benzaldehyde, 2-, 3- or 4-chloro-benzaldehyde, 2-, 3- or 4-methyl-benzaldehyde, 2-, 3- or 4-nitro-benzaldehyde, 2-, 3- or 4-methoxy-benzaldehyde, 2-, 3- or 4-ethoxy-benzaldehyde, 2- or 4-hydroxy-benzaldehyde, 4-dimethylamino-benzaldehyde, 4-diethylamino-benzaldehyde, 4-dipropylamino-benzaldehyde, 4-cyano-benzaldehyde, 2,4-dimethylbenzaldehyde, 2,5-dimethyl-benzaldehyde and 3,4-dimethoxy-benzaldehyde.

Suitable aniline derivatives are: monomethylaniline, dimethylaniline, monoethylaniline, diethylaniline, monopropylaniline, dipropylaniline, bishydroxyethylaniline, cyanoethylaniline, biscyanoethylaniline, hydroxyethylmethylaniline, N-phenylpiperidine, N-phenylmorpholine, N-methyl-2,2,4-trimethyltetrahydroquinoline, dimethyl-m-toluidine, diethyl-m-toluidine, bishydroxyethyl-m-toluidine, monomethyl-o-toluidine, dimethyl-m-chloroaniline or diethyl-m-chloroaniline.

Suitable catalysts are: nitrogen oxide or nitrogen dioxide, or substances which release nitrogen oxides under the reaction conditions—above all in acid solvents—for example iron-III nitrate or sodium nitrite. The catalysts are used in concentrations of 1 to 20 mol percent, relative to the substrate.

The process is carried out by a procedure in which the reaction components are subjected to a condensation reaction in a temperature range between 60° C. and 120° C. in a reaction medium containing an aliphatic carboxylic acid—preferably glacial acetic acid or propionic acid, which can be mixed with water, monohydric or polyhydric alcohols or ethers—and, after adding $10^{-3}$ to $10^{-1}$ mols of quinone, relative to the molar amount of the compound II, the reaction mixture is mixed intensively in the temperature range from 0° C. to 150° C., preferably from 20° C. to 70° C., with oxygen, usually pure oxygen or air, which is added and, in the course of the reaction, either 1 to 20 mol percent of nitrates or nitrites are added or a total of 1 to 20 mol percent of nitrogen oxides is metered in. The nitrogen oxides can be metered in either with the oxygen or from a separate metering device. Intensive thorough mixing of the gas and liquid is necessary in order to achieve a high rate of reaction. It is also possible to carry out the reaction under pressure.

The following examples illustrate the invention.

EXAMPLE 1

72.6 g of dimethylaniline, 10 g of urea and 31.8 g of benzaldehyde in 600 g of glacial acetic acid are heated to 100° C. for 5 hours. Thereafter, the reaction mixture is cooled, 6 g of chloranil are added and the mixture is subjected to intensive treatment with air at 30° C. In the course of the reaction, which lasts about 12 hours, a total of 1.2 g of a mixture of nitrogen monoxide and nitrogen dioxide, produced by treating sodium nitrite with sulphuric acid, is uniformly metered into the mixture. When the reaction has ended, the dyestuff yield, determined photometrically, is 90%, relative to the amount of aldehyde employed.

After evaporating off the glacial acetic acid, the dyestuff is treated with sodium hydroxide solution and precipitated as the carbinol base. After warming the carbinol base to 70° C. with oxalic acid, filtration of the mixture and cooling of the filtrate, very pure, crystalline malachite green oxalate precipitates.

Similarly good results are obtained if instead of the nitrogen oxides, either 2.5 g of sodium nitrite or 2.5 g of iron-III nitrate are uniformly added during the atmospheric oxidation.

EXAMPLE 2

72.6 g of dimethylaniline, 10 g of urea and 42 g of o-chloro-benzaldehyde in 600 g of glacial acetic acid are warmed to 100° C. under nitrogen for 5 hours. Thereafter, the reaction solution is cooled, 6 g of chloranil are added and the mixture is subjected to vigorous gassing with air at 50° C. A total of 1.2 g of a mixture of nitrogen monoxide and nitrogen dioxide is continuously metered into the mixture during the reaction. When the reaction has ended, some of the glacial acetic acid is evaporated off in vacuo, the residue is taken up in hot $H_2O$, the aqueous mixture is acidified with dilute hydrochloric acid and filtered hot and the dyestuff is precipitated with sodium chloride. The dyestuff is obtained in 80% yield.

Similar results are obtained if instead of the nitrogen oxides, sodium nitrite or iron-III nitrate is used as the catalyst.

EXAMPLE 3

89.4 g of diethylaniline, 10 g of urea and 31.8 g of benzaldehyde in 500 g of glacial acetic acid are warmed to 100° C. under nitrogen for 6 hours. After cooling the reaction solution to 30° C., 6 g of chloranil are added. Thereafter, the mixture is subjected to intensive gassing with air. A total of 1.2 g of a mixture of nitrogen monoxide and nitrogen dioxide is metered into the mixture in the course of the reaction. When the reaction has ended, the reaction solution contains diamond green in 82% yield.

Using the following benzaldehydes and aniline derivatives, triphenylmethane dyestuffs can likewise be synthesised by the process according to the invention.

| Aniline derivative | | | | Benzaldehyde |
|---|---|---|---|---|
| Example | $R^1$ | $R^2$ | $R^3$ | $R^4$ |
| 4 | $C_2H_5$ | $C_2H_5$ | H | o-Cl |
| 5 | " | " | m-$CH_3$ | " |
| 6 | " | " | " | H |
| 7 | $CH_3$ | $CH_3$ | m-$CH_3$ | H |
| 8 | " | " | " | o-Cl |
| 9 | " | " | " | p-$CH_3$ |
| 10 | " | " | H | " |
| 11 | $CH_3$ | $CH_3$ | H | p-$OCH_3$ |
| 12 | " | " | m-$CH_3$ | " |
| 13 | " | $C_2H_4CN$ | H | H |
| 14 | " | " | " | o-Cl |
| 15 | " | $CH_3$ | " | o-$NO_2$ |
| 16 | " | $C_2H_4OH$ | " | H |
| 17 | " | " | " | o-Cl |
| 18 | " | " | " | p-$CH_3$ |
| 19 | —$C_5H_{10}$— | | " | H |

I claim:

1. A one-pot process for the synthesis of a triarylmethane dyestuff of the formula

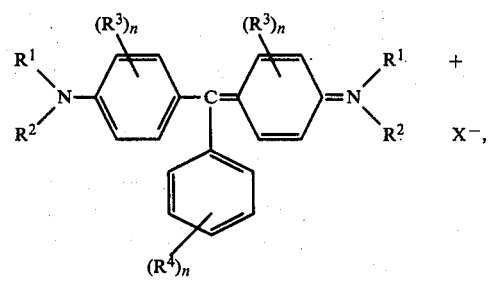

in which $R^1$ and $R^2$ represent optionally substituted alkyl, aryl or aralkyl or $R^1$ and $R^2$, together or with the ortho-position of the phenyl ring, form a heterocyclic ring and $R^1$ can additionally represent hydrogen, $R^3$ and $R^4$ denote hydrogen or non-ionic substituents, n represents an integer from 1 to 4 and $X^-$ denotes an anion, comprising condensing an aldehyde of the formula

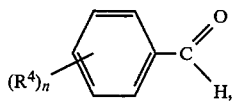

with an aromatic amine of the formula

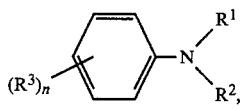

optionally in the presence of urea, and oxidizing the reaction mixture thus obtained with oxygen in the presence of a catalytic amount of a benzoquinone substituted by halogen or cyano or of a phenanthrenequinone substituted by nitro, and in the presence of 1 to 20% of a nitrogen oxide selected from the group consisting of nitrogen monoxide, nitrogen dioxide, sodium nitrite and iron-III nitrate or a substance which produces such nitrogen oxide under the reaction conditions.

2. A process according to claim 1, in which $R^1$ and $R^2$ denote $C_1$- to $C_4$-alkyl, hydroxyalkyl with two or three C atoms, cyanoethyl, alkoxyalkyl with a total of three to five C atoms, alkoxycarbonylalkyl with a total of three to eight C atoms, alkylcarbonyloxyalkyl with a total of three to eight C atoms, $C_1$- to $C_4$-halogenoalkyl, cyclohexyl, benzyl or phenethyl and $R^1$ can also represent hydrogen, phenyl or phenyl which is substituted by halogen or $C_1$- to $C_4$-alkyl or -alkoxy, $R^3$ represents hydrogen, $C_1$- to $C_4$-alkyl, $C_1$- to $C_4$-alkoxy, chlorine or bromine, $R^4$ denotes hydrogen, chlorine, bromine, hydroxyl, $C_1$- to $C_4$-alkyl, $C_1$- to $C_4$-alkoxy, nitro, cyano, mono-$C_1$- to -$C_4$-alkylamino or di-$C_1$- to -$C_4$-alkylamino, and n represents 1, and the nitrogen oxide is nitrogen monoxide, nitrogen dioxide, sodium nitrite or iron-III nitrate.

3. A process according to claim 1, in which $R^1$ and $R^2$ represent methyl, ethyl, propyl, hydroxyethyl or butyl, $R^3$ represents hydrogen, methyl or ethyl, $R^4$ represents hydrogen, chlorine or methyl, and n represents 1, and the catalyst is tetrachloro- or tetrabromo-1,4-benzoquinone and at least one of nitrogen monoxide and nitrogen dioxide.

* * * * *